United States Patent Office 2,701,227
Patented Feb. 1, 1955

2,701,227
ENZYME PRODUCTION

Frank B. Ablondi, Pearl River, N. Y., and John N. Adam, Jr., Miami, Fla., assignors to American Cyanamid Company, New York, N. Y., a corporation of Maine No Drawing. Application June 8, 1951,
Serial No. 230,696

3 Claims. (Cl. 195—66)

This invention relates to improvements in the art of producing enzymes. More particularly the present invention is concerned with improvements in the methods by which certain species of streptococci are caused to produce beneficial enzymes in a fermentation medium. The invention includes the fermentation process as well as the new medium.

In recent years considerable interest has developed in the lysis of certain materials with the aid of enzymes. Among the enzymes receiving the most attention are streptokinase and streptodornase. Streptokinase acts indirectly upon a substrate of fibrin or fibrinogen by activating a fibrinolytic enzyme in human serum which can split fibrin into smaller fragments and thus cause rapid dissolution of blood clots and fibrinous exudates. Streptodornase acts directly upon a substrate of desoxyribonucleoprotein and desoxyribonucleic acid, which are main constituents in nuclei and constitute 30% to 70% of the sediment of purulent exudates. Streptodornase splits the nucleoprotein into free purine bases and pyrimidine nucleosides, and thus causes a marked drop in the viscosity of purulent exudates.

Because of the above properties, mixtures of streptokinase and streptodornase have shown utility in the experimental treatment of certain burns, in the drainage of purulent sinuses, in the treatment of chronic infected bone abscesses or osteomyelitises, in the drainage of clotted blood from internal wounds, and in the drainage of the block in the spinal column occurring in various types of meningitis. More generally, mixtures of these two enzymes are useful in the treatment of empyema, hemothorax, hematoma and chronic suppurative infections.

The employment of streptodornase and streptokinase has been thus far limited primarily to experimental tests because these compounds are not yet commercially available. Even though the first reported use of these two compounds was as early as 1933, prior to this invention no commercial method of producing them had been developed. Applicants have developed a method of producing mixtures of streptokinase and streptodornase by means of which these enzymes with their many desirable properties can be prepared on a commercial scale for general use.

As far as is known, the only practical method of producing streptokinase and streptodornase is by the growth in a fermentation medium of certain strains of beta hemolytic streptococci. The most frequently employed streptococci are those of the Lancefield groups A, "human" C, and G, with the C strain being preferred. Many fermentation media have been tried and the results of fermentation in such media reported in the literature. The consensus among the authorities in the field, as indicated by the literature reports, is that the most desirable media for the fermentation of streptokinase-streptodornase producing organisms comprise an aqueous mixture of partially hydrolyzed animal protein materials, for instance partially hydrolyzed blood products and the like. While fermentation media comprising hydrolyzed animal protein materials such as the above produce fair results in small scale production, for instance where the fermentation is carried out in 30 liter jars, it has been found that such media cannot conveniently be used to give satisfactory results in large scale, for instance 100 gallon, fermentations. When such media are employed in an attempted large scale production of mixtures of streptokinase and streptodornase, correspondingly much smaller quantities of the enzymes are formed by the streptococci. As it is only by commercial large scale production that the benefits of streptokinase and streptodornase can be made generally available, it should be obvious that a fermentation medium that is suitable for commercial production would be highly desirable and an advance in the art.

According to the process of this invention a fermentation medium is employed comprising an enzyme hydrolyzed casein digest, glycine and an organic sulfhydryl reducing agent such as thioglycollic acid, thiomalic acid or glutathione. By the use of such fermentation media it has been found to be possible to produce mixtures of streptokinase and streptodornase on a commercial scale for the first time. Many fermentations producing mixtures of streptokinase and streptodornase and employing these new fermentation media have been run in 100 gallon and even 1,000 gallon tanks with highly satisfactory results.

The hydrolyzed casein is the primary ingredient in the new fermentation medium and is for the purpose of furnishing basal nitrogen. Any of the commercially available enzyme hydrolyzed casein digests may be used. A quite satisfactory commercially available casein digest and one which has been used in many of applicant's experiments is produced by Sheffield Farms Company, Inc., New York, N. Y., and is sold under the name of "N-Z-Amine." These digests are produced by forming an aqueous dispersion of casein and adding thereto pancreatic juices to catalyze hydrolysis. Detailed procedures for preparing enzyme hydrolyzed casein digests may be found in the technical literature, for instance see U. S. Patent No. 2,489,880, and U. S. Patent No. 2,180,637.

While the hydrolyzed casein constitutes the major part of the new fermentation media, two other ingredients, glycine and an organic sulfhydryl reducing agent, are also necessary. The amount of glycine employed in preparing the new fermentation media may vary within wide limits, for instance 1.0 to 350 parts by weight of glycine for each 1,000 parts by weight of casein digest. The optimum amount has been found to be about 100 to 200 parts of glycine for each 1,000 parts of casein digest. The amount of organic sulfhydryl reducing agent employed in the fermentation mixture may also be varied within wide limits, for instance from 0.01 to 0.5 molecular weight (mols if the weight of the casein digest is in grams) of sulfhydryl reducing agent per 1,000 parts by weight of casein digest. The optimum ratio has been found to be .03 to .07 molecular weight per 1,000 parts by weight of casein digest. The purpose of the reducing agent is simply to keep the medium in a reduced form and any of the well known sulfhydryl reducing agents may be employed.

The fact that fermentation media comprising an enzyme hydrolyzed casein digest, glycine, and a sulfhydryl reducing agent produce such superior results is indeed surprising. This is particularly true in view of the fact that media comprising acid hydrolyzed casein digests have been tried in the production of mixtures of streptokinase and streptodornase and found to be completely unsatisfactory in most instances. While the reasons for this surprising superiority are not fully understood, it is nevertheless the case that only by means of a fermentation medium comprising enzyme hydrolyzed casein, glycine, and a sulfhydryl reducing agent, has it been possible to produce streptokinase and streptodornase on a commercial scale.

The primary advantage of the new fermentation media of this invention is the increased yields obtainable in large scale production for it has heretofore been impossible to obtain in large scale production sufficient yields of enzymes so that a clinically acceptable material could be separated. The new fermentation media of this invention generally give in large scale production, for instance 100 gallon tank fermentation, yields of streptokinase per part by volume, almost three times as great as are obtained from a fermentation medium comprising an animal protein digest such as one prepared from blood proteins. In fact, fermentations in media comprising an enzyme hydrolyzed casein digest, glycine and a sulfhydryl reducing agent generally give in 100 gallon tank fermentations yields of almost twice as many units of streptokinase activity per part by volume of medium as do fermentations in a media comprising an animal protein type of material in 30 liter flasks. In other words, even on a commercial scale a medium comprising an enzyme hydrolyzed casein digest, glycine and a sulfhydryl reducing agent gives much better results than a medium comprising an animal protein digest under optimum conditions.

While the advantages of the new fermentation media are not so readily apparent in small scale production because media comprising an animal protein digest give almost equivalent yields of activity per unit of basal nitrogen under these circumstances, the new fermentation media of this invention do have advantages even in small scale production. This will be more clearly shown by the following paragraphs which disclose additional advantages of the new fermentation media of this invention, which advantages are applicable to both large and small scale production. In fact, it has been found advantageous to employ the new fermentation media of this invention in small scale production and in large scale production when employing operational procedures similar to those described in the literature or when employing new fermentation procedures which have been developed and which constitute the subject matter of copending U. S. application S. N. 230,699, filed concurrently herewith.

In addition to the advantage of higher initial yields of enzymes when employing a fermentation media comprising a casein digest, other advantages are obtained. For instance, a fermentation medium comprising a casein digest is more easily prepared than is one employing an animal protein digest such as one prepared from blood. The casein digest is easier to handle, sterilize, and to disperse. This results in a greatly reduced cost in preparing the fermentation media. In addition, the original cost of enzyme hydrolyzed casein digest is generally lower.

Animal protein digests which are commercially available contain many protein substances which are of approximately the same molecular weight and constitution as are the desired enzymes, streptokinase and streptodornase. These protein materials are precipitated by the same procedures available for precipitation of the desired enzymes and they also have similar electrophoretic properties. This makes for greatly increased difficulties in obtaining and purifying the streptokinase and streptodornase as well as an increase in the amounts of reagents necessary. These difficulties are intensified by the lower yields obtainable in a fermentation medium comprising an animal protein digest. As mentioned above, it has been found to be impossible, by the purification methods reported in the arts or even by the improved methods developed in connection with this work, to produce a product of sufficient purity for clinical use from 100 gallon fermentations employing a medium comprising an animal protein digest such as one prepared from blood.

The following table gives the purity of streptokinase which it has been possible to obtain under equivalent conditions from a medium comprising a representative animal protein digest as compared to a medium comprising a representative enzyme hydrolyzed casein digest. The animal protein digest employed was a commercially available preparation prepared by the Difco Laboratories of Detroit, Michigan, and marketed under the name of "Neopeptone." "Neopeptone" has been highly recommended by several articles on streptokinase and streptodornase production as a source of basal nitrogen. The enzyme hydrolyzed casein employed was also a commercially available material marketed by Sheffield Farms Company, Inc., of New York, N. Y., under the name of "N–Z–Amine." Purity is given in units of streptokinase per gamma of total nitrogen.

Table I

| Medium | Purity | |
| --- | --- | --- |
|  | 30 liter | 100 gallon |
| "Neopeptone" | 12 u./gamma ± | 10 u./gamma ± |
| "N–Z–Amine" | 100 u./gamma ± | 100 u./gamma ± |

Thus it will be seen that by the use of a medium comprising an enzyme hydrolyzed casein digest it is possible to obtain a product which is approximately ten times purer than that obtained by prior art methods.

In addition to an enzyme hydrolyzed casein digest, glycine and a sulfhydryl reducing agent, various other ingredients may often be advantageously added to the fermentation medium. These additional agents are referred to as "growth promoting ingredients" and include such things as vitamins, minerals, aminoacids, and trace elements. The following table lists a number of such materials as well as recommended amounts which are often advantageous.

Table II

| Growth Promoter | Parts By Weight Per Each 1,000 Parts Of Casein Digest |
| --- | --- |
| $KH_2PO_4$ | 80–160 |
| $KHCO_3$ | 50–100 |
| Uracil | 0.2–0.6 |
| Adenine Sulfate | 0.2–0.6 |
| Nicotinic Acid | .02–.06 |
| Pyridoxine | .03–.07 |
| Tryptophane | 0.4–1.0 |
| Calcium Pantothenate | 0.1–0.3 |
| Thiamin Hydrochloride | .05–.15 |
| Riboflavin | .01–.03 |
| Cystine | 2–6 |

Trace elements are usually added in the form of a salt mixture to furnish very slight amounts of the ions of such metals as iron, magnesium, copper, zinc, etc. It will often be found convenient to prepare a "salt mixture" from the salts of metals such as the above and add a small quantity of the mixture to each fermentation. The following table gives the composition of a salt mixture which has been found to be satisfactory by applicants when employed in amounts of 40 to 150 ml. per kg. of casein digest.

Table III

| Material | Amount |
| --- | --- |
| $MgSO_4$ | 11.5 kg. |
| $CuSO_4.5H_2O$ | .05 kg. |
| $ZnSO_4.7H_2O$ | .05 kg. |
| $MnCl_4.4H_2O$ | .02 kg. |
| $FeSO_4.7H_2O$ | .05 kg. |
| HCl | 1.0 liter. |
| Water qs to make | 100 liters. |

The following table shows the results of fermentations with a streptokinase-streptodornase producing strain of hemolytic streptococci, first with a fermentation medium comprising "N–Z–Amine," and second, in a fermentation medium comprising "Neopeptone." The two media were so formulated that the basal nitrogen concentration in both was the same and equal amounts of various growth promoting substances were present in all instances. Results are given in the table for fermentation in both 30 liter containers and 100 gallon tanks.

Table IV

| | "N–Z–Amine" | | "Neopeptone" | |
| --- | --- | --- | --- | --- |
| | 30 liter | 100 gallon | 30 liter | 100 gallon |
| Bacteria count | $28 \times 10^9$/cc | $19 \times 10^9$/cc | $32 \times 10^9$/cc | $40 \times 10^9$/cc |
| Streptokinase/cc | 600 u./cc | 1,170 u./cc | 600 u./cc | 430 u./cc |
| Total yield | $18 \times 10^6$ | $385 \times 10^6$ | $18 \times 10^6$ | $150 \times 10^6$ |

It will be noticed that the medium comprising "N–Z–Amine," glycine and a sulfhydryl reducing agent gave equally good yields in 30 liter containers as did the medium comprising "Neopeptone" and far superior results in 100 gallon tanks. In fact, while the production of streptokinase per unit of volume in the "Neopeptone" medium fell off sharply when fermentation was changed from 30 liter containers to 100 gallon tanks, the production of streptokinase per unit of volume in a medium comprising "N–Z–Amine" almost doubled when production was changed from 30 liter containers to 100 gallon tanks. This is quite surprising in view of the fact that the bacteria count in the "Neopeptone" 100 gallon fermentation was over twice that of the "N-Z-Amine" 100 gallon fermentation.

The higher yields of enzymes in the "N-Z-Amine" medium is far more advantageous than would appear at a superficial glance for as the units of streptokinase per unit of volume of fermentation media decreases, the problem of recovering and purifying the streptokinase becomes infinitely more complicated. This is because streptokinase is a protein like material and must be separated from a mixture containing many other proteins and the separation procedures available for such purifications result in tremendous losses. This is especially true when the desired protein like materials are present in very small quantities. In fact, the amount of streptokinase in the above 100 gallon tank fermentation employing a "Neopeptone" fermentation medium was so low in comparison to the amount of bacterial debris and other impurities that it was found to be impossible to recover a product of sufficient purity for clinical use.

The amount of casein digest per unit volume of fermentation medium may be varied within relatively wide limits. If one is primarily interested in purity of product, low concentrations of casein digest are recommended, for instance 2 to 6 parts by weight of digest per each 300 parts by volume of medium. This may be advantageous when one is concerned with producing material to be used in intravenous injections. On the other hand, if one is interested in highest total yield of streptokinase per unit of basal nitrogen employed, relatively high concentrations of casein digest are recommended, for instance 10 to 20 parts by weight of digest per each 300 parts by volume of medium.

The following table represents the results of several fermentations in 100 gallon tanks in which the amount of casein digest (N-Z-Amine) was varied. The figures given under the column headed "Purity" represent the number of units of streptokinase per gamma of nitrogen in the unpurified precipitate of activity.

Table V

| Parts by wt. of "N-Z-Amine" per 300 pts. by vol. of medium | Bacteria Count | Units of streptokinase per cc. | Purity of precipitate |
|---|---|---|---|
| 4.0 | 20×10⁹ | 400 | 50 u./gamma. |
| 8.7 | 40-60×10⁹ | 1,200 | 20-40 u./gamma. |
| 16.0 | 80×10⁹ | 2,200 | 5-25 u./gamma. |

From this it will be seen that the optimum amount of enzyme hydrolyzed casein digest to be employed depends upon whether one is primarily interested in purity of product of maximum yield.

A convenient way of preparing the fermentation medium may be illustrated by the following steps: dissolve the desired quantity of enzyme hydrolyzed casein digest in about five times its weight of hot water; sterilize by autoclaving or filtering; add sterile solutions of the required glycine and the sulfhydryl reducing agent; add sterile solutions of the growth promoting materials; and adjust the pH to about 7 to 8. The medium is then ready for inoculation. The above procedure may, of course, be varied; for instance, if the medium is to be sterilized by filtration, all of the ingredients may be added before sterilization, and if the medium is to be sterilized by autoclaving, the glycine may be added before sterilization. It is sometimes advantageous for purity of product to cool the medium to 20° C. or lower before filtering; however, if maximum yield is of prime importance, this is not recommended.

The seed inoculum is prepared by suspending a dried culture of the bacteria in a few liters of a medium such as the above and containing in addition about 20 to 70 parts by weight of a sugar per 1000 parts of basal nitrogen and growing the seed at a temperature of 35°-39° C. for about eight hours so that the bacterial count is from about $2 \times 10^9$ to $2 \times 10^{10}$ per cc. A volume of this inoculum is then employed to seed the fermentation medium so as to provide an original basterial count of about $6 \times 10^7$ to $8 \times 10^8$ per cc.

The bacteria must be furnished with large amounts of a sugar during at least part of their growth in order for them to produce the maximum amounts of streptokinase and streptodornase. Almost any of the common types of sugars may be employed. Among the disaccharides which can be employed are sucrose and maltose and among the monosaccharides which can be employed are glucose and mannose. Various procedures may satisfactorily be utilized in adding the sugar. The usual procedure for adding the sugar comprises allowing the bacteria to grow in the presence of a very small amount, i. e. 20 to 100 parts per 1000 parts of casein digest, for a period of about fourteen hours and then adding the remainder of the sugar gradually over a period of about six to eight hours. A new procedure for adding the sugar is disclosed in U. S. application S. N. 230,699 filed concurrently herewith and comprises adding large amounts of sugar, and preferably all of the sugar, before the fermentation has proceeded for a period of one hour. The total amount of sugar which may be advantageously added varies within relatively wide limits, for instance from 1500 to 4000 parts by weight per 1000 parts of casein digest.

After the fermentation medium has been inoculated it is allowed to ferment at a temperature of about 32°-40° C. and preferably at 36°-38° C. until the concentration of streptokinase reaches a minimum of about 200 units per cc. and preferably until the bacterial count reaches a maximum. During this fermentation, the pH should be maintained in the range of about pH 6.0 to pH 8.5. As the pH tends to become acidic during the fermentation and especially after large sugar additions have been started, it is necessary that frequent pH determinations be made and alkali added to maintain the pH within the operating range.

The invention will be more particularly illustrated by the following specific example which is for purposes of illustration only. All parts are by weight unless otherwise indicated.

*Example*

To 50 liters of distilled water there was added 10.17 kg. of enzyme hydrolyzed casein (N-Z-Amine). The temperature was raised to 100° C. and held until the casein digest solution was clear. The container was then cooled rapidly to 15° C. and the cooled solution filtered through a coarse grade of filter paper. A small amount of toluene was added as a preservative and the solution stored at 2° C. for four days, at the end of which time it was again filtered to remove any insoluble material.

The following ingredients were then added to the casein digest solution: 1,165.0 g. of $KH_2PO_4$ dissolved in 8 liters of distilled water; 35.0 g. of cysteine in approximately 800 cc. of 10% HCl (the least amount of 10% HCl required to obtain a clear solution); 35 g. of glycine dissolved in 100 cc. of distilled water; 300 g. of dextrose dissolved in 2 liters of distilled water; 3.5 g. of uracil dissolved in 1 liter of distilled water; 3.5 g. of adenine sulfate in 1 liter of distilled water; 0.35 g. of nicotinic acid dissolved in 35 cc. of distilled water; 0.59 g. of pyridoxine dissolved in 59 cc. of distilled water; 7.0 g. of tryptophane dissolved in 1 liter of distilled water; 1.75 g. of calcium pantothenate dissolved in 70 cc. of distilled water; 0.875 g. of thiamin hydrochloride dissolved in 87.5 cc. of distilled water; 0.175 g. of riboflavin dissolved in 1000 cc. of distilled water; 700 cc. of a salt mixture; 55.65 cc. of thioglycollic acid in 100 cc. of distilled water; 700 g. of $KHCO_3$ in 500 cc. of distilled water. The medium was then adjusted to pH 7.2 and sterilized by filtration.

The above sterilized medium was inoculated with 11 liters of seed inoculum having a bacterial count of approximately 20 billion per cc. The tank was fermented at 37° C. without pH adjustment, aeration, or other modification for fourteen hours at the end of which time 320 cc. of 50% dextrose was added. After this the pH was adjusted to 7.0 at 15 minute intervals with 5.0 N sodium hydroxide. The volume of sodium hydroxide required for neutralization was noted and 115% of this volume of 50% dextrose solution added after each pH adjustment. At the end of about eight hours the bacterial count had ceased to increase and the fermentation was terminated. At this time the fermentation medium contained approximately 1000 units of streptokinase per cc.

It will be seen from the above discussion that this invention makes available for general use these extremely valuable therapeutic agents which have heretofore been available only in extremely limited quantities, and further it makes possible production of these new therapeutic agents in a purer form than was previously possible even in limited small scale production.

We claim:
1. A process for the production of mixtures of streptokinase and streptodornase which comprises propagating beta hemolytic streptococci in an aqueous nutrient medium comprising a quantity of enzyme hydrolyzed casein digest at least sufficient to supply a primary source of basal nitrogen, at least one part by weight of glycine for each 1000 parts by weight of said enzyme hydrolyzed casein, and a quantity of sulfhydryl reducing agent at least sufficient to maintain the fermentation medium in a reduced state.

2. A process for the production of mixtures of streptokinase and streptodornase which comprises propagating beta hemolytic streptococci in an aqueous nutrient medium comprising 1,000 to 10,000 parts by weight of enzyme hydrolyzed casein per each 150,000 parts by volume of water and containing 1 to 350 parts by weight of glycine for each 1,000 parts by weight of said enzyme hydrolyzed casein and .01 to 0.5 molecular weight of a sulfhydryl reducing agent for each 1,000 parts by weight of said enzyme hydrolyzed casein.

3. A process for the production of mixtures of streptokinase and streptodornase which comprises propagating beta hemolytic streptococci in an aqueous nutrient medium comprising 1,000 to 10,000 parts by weight of enzyme hydrolyzed casein per each 150,000 parts by volume of solvent and containing 100 to 200 parts by weight of glycine for each 1,000 parts by weight of said enzyme hydrolyzed casein and 3 to 7 parts by weight of thioglycollic acid for each 1,000 parts by weight of said enzyme hydrolyzed casein.

References Cited in the file of this patent

UNITED STATES PATENTS

| | | |
|---|---|---|
| 1,744,742 | Boidin et al. | Jan. 28, 1930 |
| 2,241,927 | Sahyun | May 13, 1941 |
| 2,524,089 | Stubbs et al. | Oct. 3, 1950 |
| 2,530,210 | Smythe et al. | Nov. 14, 1950 |

OTHER REFERENCES

Porter, Bacterial Chemistry and Physiology, 1946, Wiley, pages 853, 858, 1055, 631, 632, 693, 694, 695.

Bresuer, Jour. Bact. 1 (1940), page 10.

Christensen, L. R., Jour. Gen. Physiol., 1945, 28, page 363.

Baltimore Biological Lab. Catalogue (1948), page 49.